United States Patent
Kontio et al.

(10) Patent No.: US 6,568,333 B1
(45) Date of Patent: May 27, 2003

(54) PROTECTION FOR RAILWAY VEHICLE AXLE

(75) Inventors: Camilla Kontio, Västerås (SE); Hans Persson, Ramlösa (SE); Mats Karlsson, Helsingborg (SE)

(73) Assignee: Bombardier Transportation GmbH, Berlin (DE)

( * ) Notice: Subject to any disclaimer, the term of this patent is extended or adjusted under 35 U.S.C. 154(b) by 0 days.

(21) Appl. No.: 09/937,701

(22) PCT Filed: Mar. 29, 2000

(86) PCT No.: PCT/SE00/00607

§ 371 (c)(1),
(2), (4) Date: Jan. 7, 2002

(87) PCT Pub. No.: WO00/59764

PCT Pub. Date: Oct. 12, 2000

(30) Foreign Application Priority Data

Apr. 1, 1999 (SE) ................................................ 9901197

(51) Int. Cl.[7] ................................................ B61F 15/00
(52) U.S. Cl. ................................... 105/218.1; 295/36.1
(58) Field of Search ............................. 105/218.1, 168, 105/182.1; 74/607; 228/182; 295/36.1; 301/137

(56) References Cited

U.S. PATENT DOCUMENTS

| | | | | |
|---|---|---|---|---|
| 1,709,836 A | * | 4/1929 | Buckwalter | 105/218.1 |
| 1,871,778 A | * | 8/1932 | Clasen | 105/182.1 |
| 1,887,494 A | * | 11/1932 | Murray, Jr. | 228/170 |
| 1,903,088 A | * | 3/1933 | Blackmore | 74/607 |
| 1,945,076 A | * | 1/1934 | Riemenschneider | 74/607 |
| 2,480,833 A | * | 9/1949 | Buckendale | 74/607 |
| 2,674,783 A | * | 4/1954 | Schneider et al. | 228/182 |
| 2,747,918 A | * | 5/1956 | Blackwood | 295/36.1 |
| 3,015,238 A | * | 1/1962 | Williams | 74/607 |
| 3,528,374 A | * | 9/1970 | Wickens | 105/218.1 |
| 3,793,703 A | * | 2/1974 | Winkler et al. | 74/607 |
| 3,905,086 A | * | 9/1975 | Tetlak | 301/137 |
| 4,915,436 A | * | 4/1990 | Jaus | 295/36.1 |
| 4,921,159 A | * | 5/1990 | Peck | 228/182 |
| 5,587,695 A | * | 12/1996 | Warmerdam | 336/84 R |
| 5,594,827 A | * | 1/1997 | Joulie et al. | 385/101 |

* cited by examiner

Primary Examiner—S. Joseph Morano
Assistant Examiner—Lars A. Olson
(74) Attorney, Agent, or Firm—Connolly Bove Lodge & Hutz LLP

(57) ABSTRACT

A protecting device for a wheel axle of a rail vehicle is intended to be arranged on the axle (1, 9, 13). The protecting device has the form of a cylindrical pipe with at least one slot (4, 10, 17) extending from one end of the pipe to the other.

20 Claims, 1 Drawing Sheet

PROTECTION FOR RAILWAY VEHICLE AXLE

FIELD OF THE INVENTION

The present invention relates to a protecting device for wheel axles of a rail vehicle and a rail vehicle provided with such a protecting device.

BACKGROUND ART

Rail vehicles are equipped with wheels which usually are mounted in pairs on axles. The axles are suspended from the rail vehicles and uncovered, seen from below, to facilitate dismounting when changing wheels and when servicing the vehicle. There is a risk that stones fly up from the ground and hit the axles, which may cause cracks in the axles. The cracks can, if they are allowed to grow, result in an axle fracture. This means that it is not possible to rely on a traditional fatigue analysis of the axles, but it is necessary to make frequent inspections of the axles to find any cracks. Manual inspections of the axles on a rail vehicle are expensive, and it is desirable to dispense with the inspections. This is particularly a problem in high-speed trains since the dimensions of their axles have been minimised to reduce the non-resilient mass.

A solution to the problem has been to provide the axles with a rubber layer which has been applied to the axle. The rubber layer prevents stones flying up from causing cracks in the axles, but it is necessary to remove the rubber layer in connection with the inspections that are necessary at regular intervals. It is an expensive operation to remove and apply the rubber layer in the inspections. Applying a rubber layer to the axles thus results in a minor saving only.

There is thus a need for essentially eliminating the risk of cracks caused by stones flying up without significantly increasing the inspection cost.

SUMMARY OF THE INVENTION

An object of the present invention is to provide a protecting device for axles of a rail vehicle.

A further object of the present invention is to provide a protecting device which prevents stones from hitting the axles of a rail vehicle.

One more object of the present invention is to provide means for essentially eliminating the risk of axle fracture on rail vehicles caused by stones flying up from the ground.

These objects are achieved with a protecting device for axles according to the appended claims.

A protecting device for a wheel axle of a rail vehicle according to the invention is characterised in that it is intended to be arranged on the wheel axle and essentially has the form of a cylindrical pipe having at least one slot extending from one end of the pipe to the other.

According to a preferred embodiment, the protecting device has essentially the form of a circular-cylindrical pipe.

By the wheel axle being provided with a protecting device, the problem with stones flying up from the ground and hitting the axle is obviated. By the protecting device being provided with at least one slot, it is possible to remove it from the axle and perform regular inspections of the axle without significantly increasing the maintenance cost.

It is in most cases necessary to arrange a plurality of protecting devices to cover the entire axle. This is the case, for example, if the axle is provided with a brake disc mounted in the centre of the wheel axle, or if the axle is mounted at a distance from both ends of the axle.

According to a preferred embodiment of the present invention, the protecting device has only one slot extending from, one end of the pipe to the other.

Preferably, the protecting device is held in place on the axle by being made of an elastic material. Alternatively, the protecting device is fastened by means of, for example, a clamping strap or the like. The protecting device can easily be removed by mechanically widening the slot so as to allow removal from the axle. It is an advantage if the protecting device is but a single part since this makes mounting of the protecting device quick and easy.

If the pipe has only one slot, it extends preferably rectilinearly along the pipe, but can alternatively extend helically along the pipe. If the slot extends helically along the pipe, it is possible to vary the required force for removing the protecting device from the axle, by varying the pitch of the helical form.

The material of the protecting device is preferably a polymer, such as rubber or plastic, but may also be some other material having suitable characteristics. The material is selected so that the axle protecting device can be bent sufficiently to permit mounting on the axle without the protecting device being damaged. A large amount of suitable plastics are available.

The protecting device suitably has at least one outer layer which is impact resistant.

According to an alternative embodiment, the wheel axle protecting device consists of at least two parts which radially enclose different parts of the wheel axle. The axle protecting device may consist of, for example, two halves of a cylindrical pipe which are joined in a suitable manner, such as by means of a screw joint. It is possible to make the protecting device of a non-elastic material in this embodiment.

According to a preferred embodiment of the invention, the inner surface of the protecting device facing the axle is softer than its outer surface. By having different degrees of hardness on the inner and the outer surface, the surface layer can be impact resistant while at the same time the soft inner surface allows the protecting device to mould itself along the axle so that there is no gap between the protecting device and the axle. This gives the advantage that water which may freeze cannot collect inside the protecting device. It also gives the advantage that the protecting device is better fixed to the axle, and that the risk of the protecting device wearing off an anticorrosion layer applied to the axle is minimised.

A radially varying degree of hardness of the protecting device can be achieved either by joining all the materials in concentric layers from the axle outwards, or by using plastic which has a gradient in percentage of foam so that the surface layer is essentially massive and the inner surface is foamed.

In the case of separate layers with different degrees of hardness, they can either constitute a joined unit or be separate.

It is advantageous to make the slot as narrow as possible to minimise the risk of stones flying up from hitting the axle. According to a preferred embodiment, the slot is narrower than 20 mm and preferably narrower than 10 mm.

According to an embodiment of the invention, it is ensured that the slot cannot be widened by a clamping device holding the slot together. The clamping device may consist of an integrated part of the protecting device or consist of a detachable part.

It is advantageous to arrange a slot protecting means which covers the slot in order to prevent material from penetrating through the slot. The slot protecting means consists of, for example, a strip which extends from one end of the protecting device to the other and substantially covers the slot.

According to a preferred embodiment of the invention, the protecting device has a thickness transversely of the wheel axle of 2–70 mm and preferably 5–30 mm. By limiting the thickness of the protecting device, it is possible to find room for it also on drive shafts, in which case the distance between the engine and the shaft is often small. By making the protecting device of plastic, the non-resilient mass in a rail vehicle is increased only marginally.

It goes without saying that the above features can be combined in the same embodiment.

In order to further elucidate the invention, detailed embodiments of the invention will be described below, without however restricting the invention thereto.

DESCRIPTION OF PREFERRED EMBODIMENTS

Figure 1:
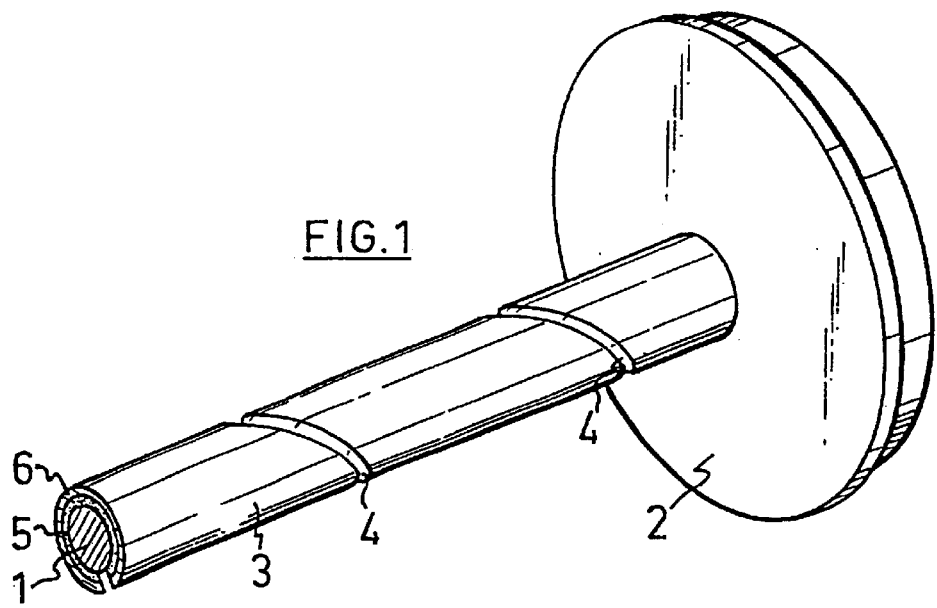
FIG. 1 is a perspective view of part of a wheel axle with a protecting device according to an embodiment of the invention.

FIG. 1 shows part of a wheel axle 1, as well as a wheel 2 and a protecting device 3 which has the form of a circular-cylindrical pipe with a slot 4 extending from one end of the pipe to the other. The slot 4 extends helically along the pipe. The protecting device has two concentric layers 5, 6. The inner layer 5 is made of foamed plastic and is glued to the outer layer 6 which is made of a homogeneous plastic. The outer layer 6 is made of an elastic plastic, which allows the protecting device 3 to be held in place on the axle 1. To dismount the protecting device from the axle, a force is applied so that the slot 4 widens sufficiently for the protecting device to be removed from the axle 1.

Figure 2:
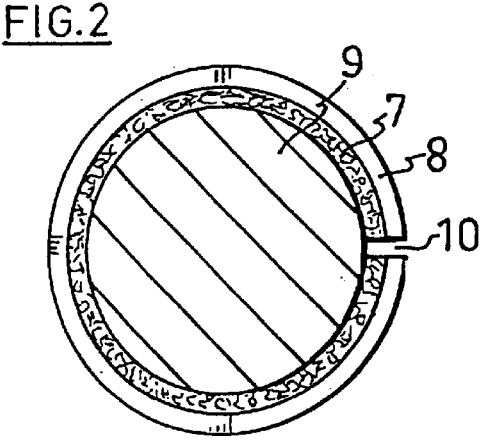
FIG. 2 is a sectional view of a wheel axle with a protecting device according to a preferred embodiment of the present invention.

FIG. 2 shows a protecting device which has essentially the form of a circular-cylindrical pipe according to a preferred embodiment of the present invention. A protecting device which consists of two layers 7, 8 is arranged on a wheel axle 9. The inner layer 7, which contacts the wheel axle 9, is made of foamed plastic which is glued to the outer layer 8, which is a homogeneous elastic plastic. The elastic plastic in the outer layer 6 causes the protecting device to be held in place on the axle. A slot 10 is formed in the protecting device and makes it possible to dismount the protecting device from the axle by applying a force so that the slot widens sufficiently to allow dismounting. The slot 10 is narrower than 20 mm, preferably narrower than 10 mm, to prevent stones flying up from the ground from hitting the axle through the slot. The total thickness of the layers 7 and 8 radially from the axle surface is 2–70 mm, preferably 5–30 mm.

Figure 3:
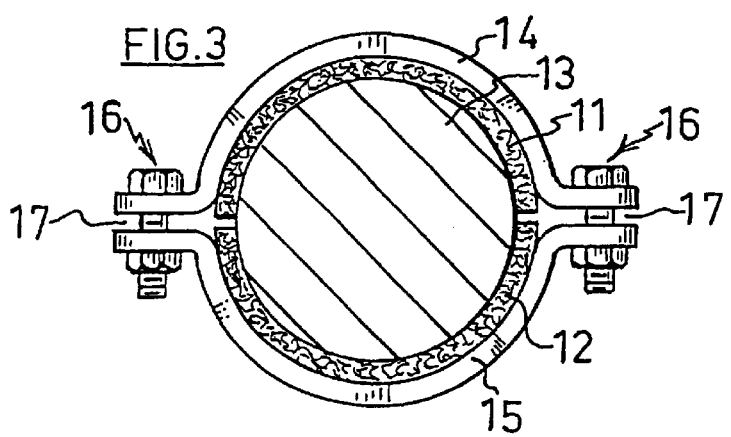
FIG. 3 is a sectional view of a wheel axle with a protecting device according to an alternative embodiment of the present invention.

FIG. 3 illustrates a protecting device for a wheel axle of a rail vehicle according to an alternative embodiment of the present invention. The protecting device consists of two halves of an essentially circular-cylindrical pipe. An inner layer closest to the axle consists of two semicylindrical layers 11, 12 which are made of rubber and arranged against the axle 13. The outer layer of the protecting device consists of two halves of a cylindrical pipe 14, 15 which are joined by means of a screw joint 16. The protecting device 16 has two slots 17 between the two halves. The screw joint permits the protecting device to be clamped to the axle 13, thereby preventing it from sliding as the axle rotates. The screw joint 16 makes it possible to dismount the protecting device when the axle is to be inspected.

Figure 4:
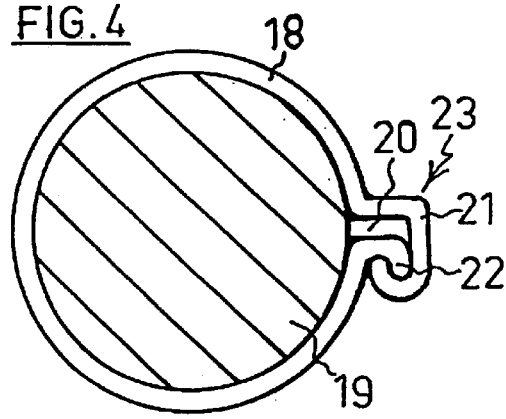
FIG. 4 is a sectional view of a wheel axle with a protecting device according to an alternative embodiment of the present invention.

FIG. 4 shows a protecting device according to an alternative embodiment of the present invention. A protecting device which consists of a layer 18 of an elastic plastic is arranged on a wheel axle 19. A slot 20 is formed in the protecting device and snakes it possible to dismount the protecting device from the axle by applying a force so that the slot widens sufficiently to allow dismounting. A slot protecting means 21 arranged on the protecting device covers essentially the entire slot and extends from one end of the protecting device to the other. The slot protecting means prevents particles from penetrating through the slot to the axle. The slot protecting means 21 is designed to cooperate with a hook 22 arranged on the slot side opposite to the slot protecting means. The hook 22 and the slot protecting means 21 constitute a locking device 23 which prevents the slot from widening. The hook 22 can be omitted if only the slot protecting means is desired. The hook 22 and the slot protecting means 21 need only extend along part of the slot if only widening of the slot is to be prevented.

The embodiments described above are to be considered examples only.

A person skilled in the art realises that the above embodiments may be varied in a number of ways without departing from the inventive idea. For example, the screw joint can in the embodiment in FIG. 3 be replaced by a clamping strap which clamps the two halves of the protecting device.

What is claimed is:

1. A protecting device for a wheel axle of a rail vehicle, comprising:
   an essentially cylindrical pipe having least one slot extending from a first end of the pipe to a second end of the pipe, wherein the protecting device is adapted to be arranged on the wheel axle, and wherein the at least one slot is sufficiently widenable to allow the protecting device to be removed from the wheel axle.

2. A protecting device for a wheel axle of a rail vehicle according to claim 1, wherein the at least one slot extends helically from the first end of the pipe to the second end of the pipe.

3. A protecting device for a wheel axle of a rail vehicle according to claim 1, wherein the at least one slot extends rectilinearly from the first end of the pipe to the second end of the pipe.

4. A protecting device for a wheel axle of a rail vehicle according to claim 1, wherein the protecting device is made of an elastic material.

5. A protecting device for a wheel axle of a rail vehicle according to claim 1, wherein the protecting device is made of a polymer.

6. A protecting device for a wheel axle of a rail vehicle according to claim 1, wherein an inner surface of the pipe facing the wheel axle is softer than an outer surface of the pipe.

7. A protecting device for wheel axle of a rail vehicle according to claim 1, wherein the pipe comprises an inner layer and an outer layer, wherein the inner layer and outer layer are concentric, and wherein the inner layer is softer than the outer layer.

8. A protecting device for a wheel axle of a rail vehicle according to claim 1, wherein the protecting device has a thickness transversely of the wheel axle of 2–70 mm.

9. A protecting device for a wheel axle of a rail according to claim 1, wherein the pipe comprises at least two interconnected parts which each cover different radial parts of the wheel axle.

10. A protecting device for a wheel axle of a rail vehicle according to claim 1, wherein the protecting device includes a clamping device which prevents the slot from widening.

11. A protecting device for a wheel axle of a rail vehicle according claim 1, wherein the protecting device includes a slot protecting means which essentially covers the slot and prevents particles from penetrating through the slot.

12. The protecting device of claim 1, wherein the protecting device is arranged on a rail vehicle having at least one wheel axle with two wheels.

13. A method of protecting a wheel axle of a rail vehicle, comprising installing the protecting device of claim 1 on a rail vehicle.

14. The protecting device of claim 6, wherein the protecting device is arranged on a rail vehicle having at least one wheel axle with two wheels.

15. The protecting device of claim 7, wherein the protecting device is arranged on a rail vehicle having at least one wheel axle with two wheels.

16. The protecting device of claim 9, wherein the protecting device is arranged on a rail vehicle having at least one wheel axle with two wheels.

17. The protecting device of claim 11, wherein the protecting device is arranged on a rail vehicle having at least one wheel axle with two wheels.

18. A method of protecting a wheel axle of a rail vehicle, comprising installing the protecting device of claim 6 on a rail vehicle.

19. A method of protecting a wheel axle of a rail vehicle, comprising installing the protecting device of claim 7 on a rail vehicle.

20. A method of protecting a wheel axle of a rail vehicle, comprising installing the protecting device of claim 9 on a rail vehicle.

* * * * *